UNITED STATES PATENT OFFICE.

WILLIAM C. MARSHALL, OF NEW YORK, N. Y.

PRESERVING MEATS.

SPECIFICATION forming part of Letters Patent No. 270,089, dated January 2, 1883.

Application filed May 13, 1880. (No specimens.) Patented in England May 29, 1880, No. 2,189.

*To all whom it may concern:*

Be it known that I, WILLIAM C. MARSHALL, a citizen of the United States, residing at New York, in the county and State of New York, have invented new and useful Improvements in Preserving Meats, of which the following is a specification.

This invention consists in a new and improved process for preserving meat by first curing the same, then cooking it, then packing the same in bladders or intestines, then exposing the packages to pressure for the purpose of expelling the moisture still remaining in the meat, and finally in drying the packages by smoking.

In carrying out my invention I first subject the meat to the action of salt, saltpeter, sugar, or any of the ordinary antiseptics used for curing meats. After having been cured the meat is thoroughly cooked by the direct action of fire or by steam. I then take the bladders or large intestines of an ox or hog, and after having them well cleaned I introduce therein the cured and cooked meat, packing it closely, and then the bladders or intestines are strongly tied. The packages of meat thus formed are now subjected to a heavy pressure, which has the effect of eliminating a large proportion of the water still contained in the meat, which has not been expelled by the cooking, and which it is necessary to remove, as the water is the active agent in producing putrefaction. By the pressure the water is forced out through the pores of the bladders or intestines, which form the integuments for my package of meat. After the pressing operation has been completed the packages are removed to a smoking-room and thoroughly dried by the action of smoke, after which they may be packed and shipped to any climate.

I am aware that meat has heretofore been cooked and packed in cans, and also that raw meat has heretofore been packed in bladders or intestines of animals, and cooked after having been thus packed. By this process, however, the bladders are made tender, and a large proportion of the water of the meat remains in the bladder, so that the meat will not keep sweet for a great while, and is totally unfit for shipment to foreign climates. By my process an entirely new article of commerce is created, which will keep perfect for a long time.

Heretofore meat has been packed in bladders or intestines in a cooked state, or inserted in a raw state, and then cooked and smoked. By cooking the raw meat in an integument, as just stated, the integument is deprived of its strength, being materially weakened, and bursts when subjected to pressure; and, further, the water of the meat, which cannot escape, soon causes or tends to cause putrefaction.

Letters Patent No. 43,516, dated July 12, 1864, reissued May 25, 1875, No. 6,451, were granted me for a process of preserving meat, which consists in rendering the water contained in the meat proof against putrefaction by salting, and then expelling it, together with the air, entirely from the meat by heavy pressure, after which it was hermetically sealed in cans. Therefore such is not claimed herein.

What I claim as new, and desire to secure by Letters Patent, is—

The herein-described process for preserving meat, the same consisting in first curing the meat, then cooking it, then packing it in a bladder or intestine, next subjecting the package to pressure to expel the moisture remaining in the meat, and finally drying the said package by smoking the same, as specified.

In testimony whereof I have hereunto set my hand and seal in the presence of two subscribing witnesses.

W. C. MARSHALL. [L. S.]

Witnesses:
W. HAUFF,
E. F. KASTENHUBER.